(12) United States Patent
Oh

(10) Patent No.: US 11,221,701 B2
(45) Date of Patent: Jan. 11, 2022

(54) TOUCH DISPLAY DEVICE AND DRIVING METHOD WITH ORTHOGONAL TOUCH DRIVING SIGNALS

(71) Applicant: LG Display Co., Ltd., Seoul (KR)

(72) Inventor: SeungSeok Oh, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/928,948

(22) Filed: Jul. 14, 2020

(65) Prior Publication Data

US 2021/0141478 A1 May 13, 2021

(30) Foreign Application Priority Data

Nov. 13, 2019 (KR) .................. 10-2019-0144842

(51) Int. Cl.
*G06F 3/041* (2006.01)
*G02F 1/1333* (2006.01)
*G06F 3/044* (2006.01)

(52) U.S. Cl.
CPC ........ *G06F 3/0412* (2013.01); *G02F 1/13338* (2013.01); *G06F 3/0446* (2019.05); *G06F 3/04166* (2019.05); *G06F 3/04186* (2019.05); *G06F 2203/04103* (2013.01)

(58) Field of Classification Search
CPC ............... G02F 1/13338; G02F 3/0412; G02F 3/04186; G02F 3/0446; G02F 3/04166; G02F 2203/04103
See application file for complete search history.

(56) References Cited

U.S. PATENT DOCUMENTS

| | | | |
|---|---|---|---|
| 2011/0175835 A1* | 7/2011 | Wang .................... | G06F 3/0446 345/173 |
| 2013/0162570 A1* | 6/2013 | Shin .................. | G02F 1/133345 345/173 |
| 2016/0253001 A1* | 9/2016 | Sugita ................. | G06F 3/04166 345/174 |
| 2017/0255299 A1* | 9/2017 | Shimoshikiryoh ... | G06F 3/0443 |

* cited by examiner

*Primary Examiner* — Liliana Cerullo
(74) *Attorney, Agent, or Firm* — Fenwick & West LLP

(57) ABSTRACT

The present disclosure relates to touch display device and touch driving methods, and more specifically, to a touch display device and a touch driving method for accurately performing touch sensing by applying touch driving signals orthogonal to one another to adjacent touch electrodes.

17 Claims, 12 Drawing Sheets

FIG.6

|      | T1 | T2 | T3 | T4 | T5 | T6 | T7 | T8 |
|------|----|----|----|----|----|----|----|----|
| TDS1 | 1  | -1 | 1  | -1 | 1  | -1 | 1  | -1 |
| TDS2 | 1  | 1  | -1 | -1 | 1  | 1  | -1 | -1 |
| TDS3 | 1  | -1 | -1 | 1  | 1  | -1 | -1 | 1  |
| TDS4 | 1  | 1  | 1  | 1  | -1 | -1 | -1 | -1 |
| TDS5 | 1  | -1 | 1  | -1 | -1 | 1  | -1 | 1  |
| TDS6 | 1  | 1  | -1 | -1 | -1 | -1 | 1  | 1  |

FIG.9

|  | a | b | c | d | e | f |
|---|---|---|---|---|---|---|
| Up Channel | TE1-TE6 (N,S) | TE5-TE6 (N,B) | TE2-TE6 (T,B) | TE6-TE6 (T,Self) | TE3-TE6 (T,S) | TE7-TE6 (T,B) |
| Down Channel | TE1'-TE6' (N,B) | TE5'-TE6' (N,S) | TE2'-TE6' (N,S) | TE6'-TE6' (N,Self) | TE3'-TE6' (N,B) | TE7'-TE6' (N,S) |

TOUCH DISPLAY DEVICE AND DRIVING METHOD WITH ORTHOGONAL TOUCH DRIVING SIGNALS

CROSS-REFERENCE TO RELATED APPLICATION

This application claims the priority benefit of Republic of Korea Patent Application No. 10-2019-0144842, filed on Nov. 13, 2019 in the Korean Intellectual Property Office, the disclosure of which is incorporated herein by reference in its entirety

BACKGROUND

1. Technical Field

The present disclosure relates to a touch display devices and touch driving methods.

2. Description of the Related Art

As the information-oriented society has been developed, various needs for display devices for displaying an image have increased. Recently, various types of display devices, such as a liquid crystal display (LCD), a plasma display panel (PDP), and an organic light emitting diode display (OLED), have been utilized.

The liquid crystal display among the display devices displays images by adjusting the light transmittance of a liquid crystal using electric fields. To do this, the liquid crystal display usually includes a liquid crystal display panel on which liquid crystal cells are arranged in a matrix form, and a driving circuit for driving the liquid crystal display panel.

A plurality of data lines and a plurality of gate lines intersect each other in an array of pixels of the liquid crystal display panel, and a thin film transistor (TFT) for driving the liquid crystal cell is formed in an area in which each gate line and each data line intersect. Further, a storage capacitor for remaining a voltage of a liquid crystal cell at a certain level is formed in the liquid crystal display panel, and the liquid crystal cell includes a pixel electrode, a common electrode, and a liquid crystal layer. Electric fields are formed through the liquid crystal layer including the liquid crystal cells by a data voltage applied to the pixel electrode and a common voltage VCOM applied to the common electrode. At this time, an amount of light transmitting the liquid crystal layer by the electric fields can be adjusted, and thus, images can be produced.

The driving circuit can include a gate driving circuit for sequentially providing gate signals to the gate lines GL, and a data driving circuit for providing image signals (i.e. data voltages) to data lines DL. The data driving circuit can provide data voltages to the liquid crystal cells by driving the data lines DL. The gate driving circuit selects on one horizontal line basis the liquid crystal cells of the display panel to which data voltages are provided by sequentially driving the gate lines GL.

To generate gate signals sequentially, the gate driving circuit includes a gate shift register configured with multiple stages. Each stage of the shift register alternately performs charging and discharging, and a result, outputs a gate output signal including a gate clock signal of a low voltage level. Output ends of stages are connected to the gate lines on a one-to-one basis, respectively. Gate signals of a first level are sequentially generated from the stages once for each frame, and then provided to respective gate lines GL.

Meanwhile, in providing a touch input function in display devices, for providing thin portable devices, such as a smart phone, a tablet PC, or the like, an in-cell type touch display device in which components for a touch screen are integrated inside of the display panel of the touch display device has been developed and utilized.

Such a touch display device uses a common electrode for driving each pixel as a touch electrode for touch sensing. Accordingly, during a display period, a common voltage is provided to a thin film transistor, and during a touch period, a touch driving signal is provided to the touch electrode.

At this time, when the number of touch electrodes is increased to increase touch sensitivity, in turn, the number of touch lines connected to the touch electrodes and the number of touch sensing units for sensing touch signals are increased.

Thus, by dividing an area of the display panel into sub-areas, and then connecting one touch line to a touch electrode in each sub-area one by one, introduced and utilized is a method of reducing the number of touch lines and the number of touch sensing units.

However, when the area of the display panel is divided into sub-areas, and one touch line is connected to a plurality of touch electrodes, since resulted touch signals are duplicately generated, it is therefore desirable to provide a method of distinguishing a ghost touch recognized in a sub-area in which a touch has not been actually performed among the divided sub-areas.

SUMMARY

In accordance with embodiments of the present disclosure, a touch display device and a touch driving method are provided that are capable of distinguishing an actual touch from a ghost touch.

Further, in accordance with embodiments of the present disclosure, by applying touch driving signals orthogonal to each other to adjacent touch electrodes, a touch display device and a touch driving method are provided that are capable of accurately sensing a touch.

In accordance with one aspect of the present disclosure, a display device is provided that includes a display panel including a plurality of first touch electrodes disposed in a first channel area, a plurality of second touch electrodes disposed in a second channel area, and a plurality of touch lines, and a touch circuit providing touch driving signals orthogonal to one another to adjacent touch electrodes through at least one of the plurality of touch lines, in which the at least one of the plurality of touch lines is connected to at least one of at least one of the plurality of first touch electrodes and at least one of the plurality of second touch electrodes through a plurality of contact holes.

In the display device in accordance with one aspect of the present disclosure, the plurality of touch lines includes a first touch line and a second touch line. The first touch line is connected to one of touch electrodes disposed in a nth row of the first channel area and one of touch electrodes disposed in a pth row of the second channel area, where n and p are natural numbers of 1 or more, and the second touch line is connected to another, which is not connected to the first touch line, of the touch electrodes disposed in the nth row of the first channel area and one of touch electrodes disposed in another row other than the pth row of the second channel area.

In the display device in accordance with one aspect of the present disclosure, the first channel area, or the second channel area, in which a plurality of touch electrodes is sequentially disposed along a first direction may be connected to a touch line through one or more contact holes.

In the display device in accordance with one aspect of the present disclosure, the first channel area or the second channel area may include a plurality of multiplexers each applying an independent scan signal.

In the display device in accordance with one aspect of the present disclosure, the touch driving signals orthogonal to one another may be applied to adjacent touch electrodes in a direction intersecting the touch line.

In the display device in accordance with one aspect of the present disclosure, the touch circuit may include a touch controller distinguishing between an actual touch and a ghost touch by deriving self-capacitances and mutual capacitances from touch sensing signals transferred from touch electrodes.

In the display device in accordance with one aspect of the present disclosure, the touch controller can determine the presence of a touch using the self-capacitances and determine touch relevance with adjacent touch electrodes using the mutual capacitances.

In the display device in accordance with one aspect of the present disclosure, the touch controller can determine that an actual touch has been performed on a touch electrode on which the touch is present and which the touch relevance is high.

In the display device in accordance with one aspect of the present disclosure, the touch circuit may include a sensing unit receiving touch sensing signals transferred from the touch electrodes as a first input signal, and receiving touch driving signals applied to touch electrodes as a second input signal, a switch for deriving the self-capacitances and the mutual capacitances according to the touch driving signals.

In the display device in accordance with another aspect of the present disclosure, in a method of driving a display panel on which a display panel including a plurality of first touch electrodes disposed in a first channel area, a plurality of second touch electrodes disposed in a second channel area, and at least one of a plurality of touch lines is connected to at least one of the plurality of first touch electrodes and at least one of the plurality of second touch electrodes through a plurality of contact holes, a touch sensing method is provided that includes providing touch driving signals orthogonal to one another to one or more adjacent touch electrodes through at least one of the plurality of touch lines, deriving self-capacitances and mutual capacitances from touch sensing signals transferred from touch electrodes, and distinguishing between an actual touch and a ghost touch.

In accordance with embodiments of the present disclosure, it is possible to provide a touch display device and a touch driving method that are capable of distinguishing between an actual touch and a ghost touch.

Further, in accordance with embodiments of the present disclosure, by applying touch driving signals orthogonal to one another to respective adjacent touch electrodes, it is possible to provide a touch display device and a touch driving method that are capable of accurately sensing a touch.

BRIEF DESCRIPTION OF THE DRAWINGS

FIG. 6 illustrates an orthogonal relationship between touch driving signals applied through a touch line in the touch display device according to another embodiment of the present disclosure.

FIG. 9 illustrates an effect of capacitances formed between a sixth touch electrode TE6 and adjacent touch electrodes using coefficients (a to f) determined from a value of a touch sensing signal TSS of the sixth touch electrode TE6, in the case of FIG. 7 according to embodiments of the present disclosure.

DETAILED DESCRIPTION

Figure 1:
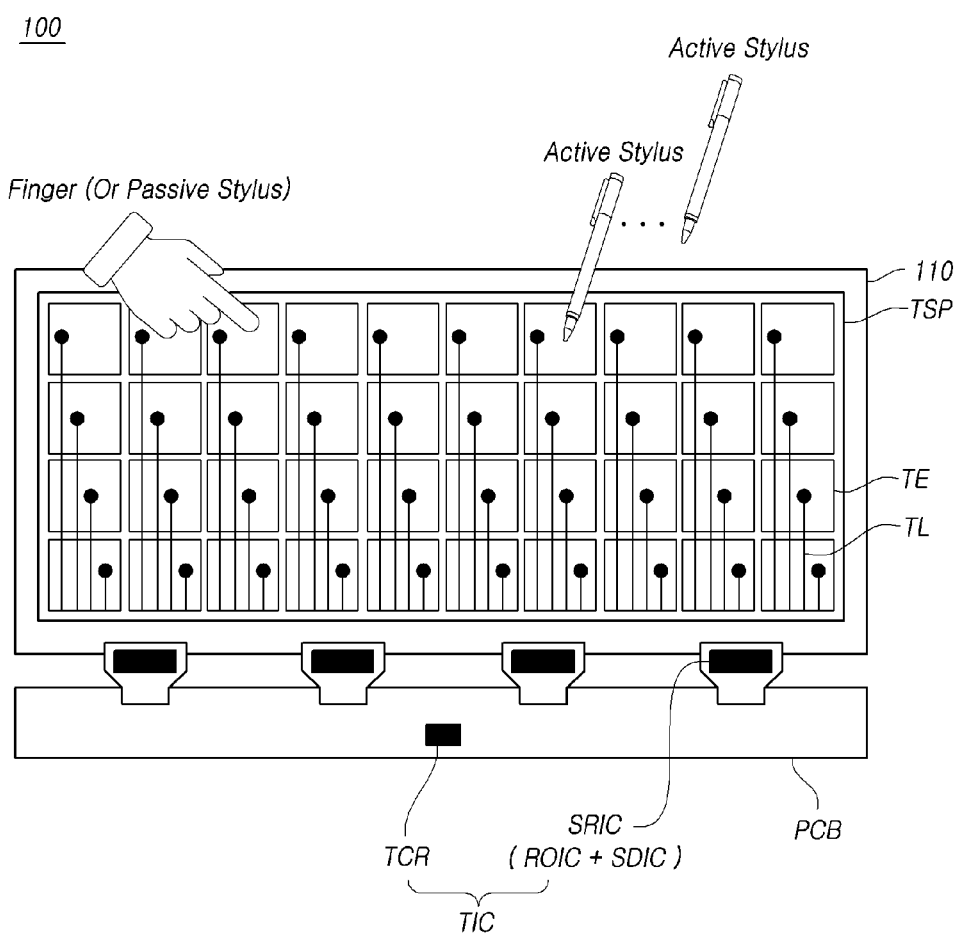
FIG. 1 illustrates a touch display device according to embodiments of the present disclosure.

In the following description of examples or embodiments of the present invention, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present invention, detailed descriptions of well-known functions and components incorporated herein will be omitted when it is determined that the description may make the subject matter in some embodiments of the present invention rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present invention. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

FIG. 1 illustrates a touch display device according to embodiments of the present disclosure.

Referring to FIG. 1, the touch display device 100 according to embodiments of the present disclosure may be, for example, a display device capable of providing a function of sensing a touch of a passive stylus such as a finger, a conductive object, or the like, and a function of sensing a touch of an active stylus such as a pen, in addition to a function of displaying images.

The touch display device 100 according to embodiments of the present disclosure may be a display device in which a touch screen panel TSP including a plurality of touch electrodes TE as touch sensors is integrated into a display panel 110. For example, the touch display device 100 may be a television TV, a monitor, or the like, or a mobile device such as a tablet, a smart phone, or the like.

For example, the touch display device 100 may divide a common electrode used in a display period into a plurality of groups and then use the plurality of divided groups as a plurality of touch electrodes TE.

In another example, the touch display device 100 may use a plurality of touch electrodes TE as touch sensing dedicated electrodes (i.e. touch driving dedicated electrodes).

The display panel 110 may be a liquid crystal display panel, an organic light emitting diode display panel, or the like.

For example, when the display panel 110 is the liquid crystal display panel, the touch display device 100 may divide a common electrode to which a common voltage is applied and which forms electric fields with pixel electrodes into a plurality of groups and then use the plurality of divided groups as respective touch electrodes TE.

In another example, when the display panel 110 is the organic light emitting diode display panel, the touch display device 100 may include an organic light emitting diode OLED including a first electrode, an organic light emitting layer, and a second electrode, and an encapsulation layer located over them with a encapsulating function, and a touch sensor metal layer located on the encapsulation layer. Here, a plurality of touch electrodes may be formed in the touch sensor metal layer.

Hereinafter, for convenience of description and ease of understanding, it is assumed that a plurality of touch electrodes TE is used as touch driving electrodes (touch sensors) in the process of touch driving, and is used as a common electrode in the process of display driving.

The touch display device 100 may include a touch circuit TIC performing touch sensing and stylus sensing using signals received through the display panel 110 by driving the display panel 110 in which the touch screen panel TSP is integrated.

The touch circuit TIC may include a first circuit receiving signals through the display panel 110 by driving the display panel 110, and a second circuit performing passive touch sensing (e.g., a finger touch sensing) and an active touch sensing using the signals received through the display panel 110.

The first circuit may be referred to as a touch driving circuit ROIC, and the second circuit may be referred to as a touch controller TCR.

The touch driving circuit ROIC may be implemented as an integrated driving circuit SRIC together with a data driving circuit SDIC for driving data lines.

The integrated driving circuit SRIC may be implemented in a type of Chip On Film (COF) in which the integrated driving circuit SRIC is mounted on a film.

The film on which the integrated driving circuit SRIC is mounted may be attached to a bonding portion of the display panel 110 and a bonding portion of a printed circuit board PCB.

The touch controller TCR or other elements may be mounted on the printed circuit board PCB.

The touch driving circuit ROIC and the data driving circuit SDIC may be implemented as separate driving chips. The touch driving circuit ROIC may be electrically connected to a plurality of touch electrodes TE included in the display panel 110 through a plurality of touch lines TL.

At this time, the touch driving circuit ROIC may perform touch sensing during a touch period separated from a display period in the time domain, or the touch period and the display period may be an equal time period in which the touch sensing in the touch period and image displaying in the display period may be performed simultaneously.

The touch display device 100 may be various display devices, such as a liquid crystal display, an organic light emitting diode display, a plasma display panel, a quantum dot display or the like.

Meanwhile, the touch display device 100 may sense the presence or absence of a touch or a touch coordinate based on capacitances formed through one or more touch electrodes TE.

The touch display device 100 may sense a touch in capacitance-based touch sensing schemes, such as a mutual capacitance touch sensing scheme or a self-capacitance touch sensing scheme.

In the case of the mutual capacitance touch sensing scheme, a plurality of touch electrodes TE may include driving electrodes to which touch sensing signals are applied via driving lines, and sensing electrodes configured to provide sensing signals via sensing lines and forming capacitances with the driving electrodes. Each or both of the driving line and the sensing line may be referred to as a touch line TL.

In the case of such a mutual capacitance touch sensing scheme, the presence or absence of a touch and a touch coordinate may be detected based on changes in mutual capacitances formed between the driving electrode and the sensing electrode according the presence or absence of a pointer, such as a finger, a pen, or the like.

In the case of the self-capacitance touch sensing scheme, each touch electrode TE serves as both the driving electrode and the sensing electrode. That is, a touch driving signal is applied to each touch electrode TE, and the touch circuit TIC receives a touch sensing signal via the touch electrode to which the touch driving signal is applied. Accordingly, in the self-capacitance touch sensing scheme, it is not necessary to distinguish between a driving electrode and a sensing electrode.

In the case of such a self-capacitance touch sensing scheme, the presence or absence of a touch and a touch coordinate may be detected based on changes in capacitances formed between a pointer, such as a finger, a pen, or the like and a touch electrode TE.

Thus, the touch display device 100 may sense a touch by the mutual capacitance touch sensing scheme or the self-capacitance touch sensing scheme.

Figure 2:
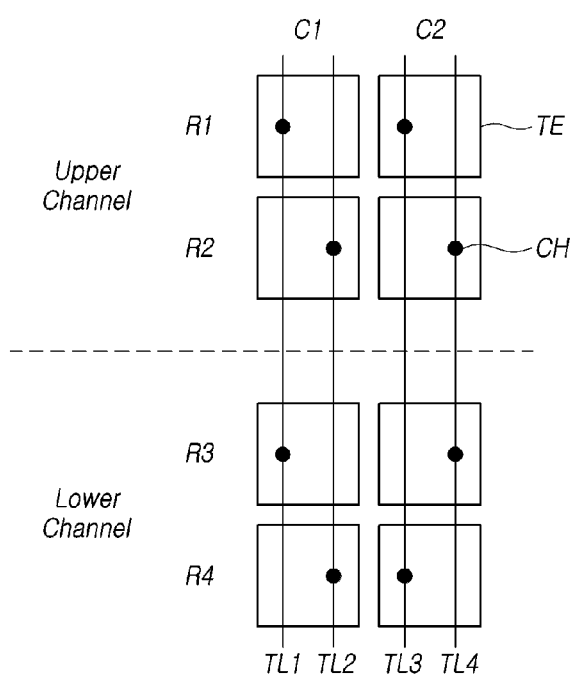
FIG. 2 illustrates a case where a display panel is divided into a plurality of areas, and a touch line is duplicately connected to touch electrodes of the divided areas in the touch display device according to embodiments of the present disclosure.

FIG. 2 illustrates a case where a display panel is divided into a plurality of areas, and a touch line is duplicately connected to touch electrodes of the divided areas in the touch display device according to embodiments of the present disclosure.

Referring to FIG. 2, the display panel 110 of the touch display device 100 according to embodiments of the present disclosure may include a plurality of touch electrodes TE corresponding to a plurality of groups divided from a common electrode used in a display period.

At this time, the plurality of touch electrodes TE may be disposed in a row (horizontal) direction and a column (vertical) direction, and thus, disposed in a matrix form. Here, as an example, touch electrodes TE included in the display panel 110 are simplified and as a result, touch electrodes TE are disposed in a total of 4 rows R1, R2, R3, and R4 and 2 columns C1 and C2.

When the touch electrodes TE are disposed in 4 rows R1, R2, R3, and R4, touch electrodes TE located in the first row R1 and the second row R2, which are located in an upper portion of the 4 rows, may be classified as an upper channel, and touch electrodes TE located in the third row R3 and the fourth row R4, which are located in a lower portion of the 4 rows, may be classified as a lower channel.

At this time, although respective scan signals are applied to the upper channel and the lower channel at different times, and the upper channel and the lower channel are operated at different times, since one touch electrode TE selected from the upper channel and one touch electrode TE selected from the lower channel are connected using an equal touch line TL, touch electrodes TE may be driven through touch lines corresponding to half of the number of touch electrodes TE disposed in one column.

That is, in a situation where one contact hole CH is formed in one touch electrode TE, when 4 touch electrodes TE are disposed in one column, all touch electrodes disposed in one column can be connected through two touch lines TL.

For example, a first touch line TL1 arranged in the first column C1 may be connected to both a touch electrode TE located in the first row R1 of the upper channel and a touch electrode TE located in the third row R3 of the lower channel, and a second touch line TL2 in the first column C1 may be connected to both a touch electrode TE located in the second row R2 of the upper channel and a touch electrode TE located in the fourth row R4 of the lower channel.

In this arrangement, since contact holes CH formed in the touch electrodes TE of the upper channel and contact holes CH formed in the touch electrodes TE of the lower channel are equally disposed, when a touch is performed by a finger of a user or a stylus, touch sensing signals are equally generated in the upper channel and the lower channel. Therefore, it may be not easy to distinguish between an actual touch and a ghost touch.

Accordingly, to distinguish between an actual touch and a ghost touch, it may be desirable that the disposition of the contact holes CH formed in the touch electrodes TE of the upper channel and the contact holes CH formed in touch electrodes TE of the lower channel are arranged to be different from each other.

In the second column C2, a third touch line TL3 arranged in the second column C2 may be connected to both a touch electrode TE located in the first row R1 of the upper channel and a touch electrode TE located in the fourth row R4 of the lower channel, and a fourth touch line TL4 in the second column C2 may be connected to both a touch electrode TE located in the second row R2 of the upper channel and a touch electrode TE located in the third row R3 of the lower channel.

In this arrangement, in a situation where contact holes CH formed in the touch electrodes TE of the upper channel and contact holes CH formed in the touch electrodes TE of the lower channel are disposed to be different from each other, since in a relationship with one or more adjacent touch electrode(s) TE, touch sensing signals generated from the upper channel and the lower channel are distributed differently, thus, it is possible to distinguish between an actual touch and a ghost touch.

Methods of differently arranging the contact holes of the upper channel and the lower channel can be variously changed depending on the number of touch electrodes TE disposed in the display panel 110. In this case, it is effective that contact holes CH between adjacent touch electrodes TE are differently disposed in the upper channel and the lower channel.

At this time, a method of distinguishing between an actual touch and a ghost touch from touch sensing signals generated in the upper channel and the lower channel can be implemented by applying different touch driving signals TDS to adjacent touch electrodes TE and distinguishing a difference resulted from the different touch driving signals TDS.

In particular, the different touch driving signals TDS applied to adjacent touch electrodes TE may be signals orthogonal to each other.

Figure 3:
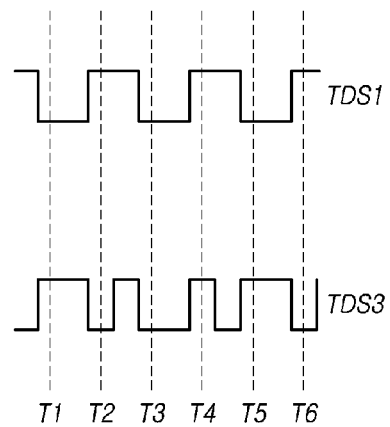
FIG. 3 illustrates an orthogonal relationship between touch driving signals applied through one or more touch line(s) in the touch display device according to embodiments of the present disclosure.

FIG. 3 illustrates an orthogonal relationship between touch driving signals applied through one or more touch line(s) in the touch display device according to embodiments of the present disclosure.

Referring to FIG. 3, in the touch display device 100 according to embodiments of the present disclosure, a touch driving signal TDS applied to a touch electrode TE through a touch line TL may be orthogonal to a touch driving signal TDS applied to an adjacent touch electrode TE.

For example, when 2 touch lines are arranged for touch electrodes TE in a first column, and a high level of voltage and a low level of voltage of a touch driving signal TDS are represented as 1 and −1, respectively, a first touch driving signal TDS1 applied to the touch electrodes TE in the first column through a first touch line TL1 may have voltage levels of −1, 1, −1, 1, −1, and 1 in order of disposed touch electrodes in time periods (T1, . . . , T6) having an equal interval.

Further, a third touch driving signal TDS3 applied to touch electrodes TE in a second column adjacent to the first column through a third touch line TL3 may have voltage levels of 1, −1, −1, 1, 1, and −1 in order of disposed touch electrodes for the time periods (T1, . . . , T6) to which the first touch driving signal TDS1 is applied.

The correlation between the first touch driving signal TDS1 and the third touch driving signal TDS3 can be represented as (−1×1)+(1×−1)+(−1×−1)+(1×1)+(−1×1)+(1×−1)=0, and thus, it can be seen that they are orthogonal to each other.

That is, when touch driving signals TDS applied to adjacent touch electrodes TE are orthogonal to each other, it is possible to distinguish mutual capacitances caused by the adjacent touch electrodes TE.

Here, since the first touch line TL1 and a second touch line TL2 are connected to the touch electrodes TE in the first column, the third touch line TL3 and a fourth touch line TL4 are connected to the touch electrodes TE in the second column, it is effective that the first touch driving signal TDS1 applied to the first touch line TL1 has the orthogonal relationship with the fourth touch driving signal TDS4 applied to the fourth touch line TL4, as well as the third touch driving signal TDS3 applied to the third touch line TL3.

Such orthogonal relationship may be applicable not only between touch driving signals TDS applied for adjacent touch electrodes TE, but for the touch driving signals TDS applied to adjacent touch lines TLs.

That is, the first touch driving signal TDS1 applied to the first touch line TL1 and the second touch driving signal TDS2 applied to the second touch line TL2 can be orthogonal to each other.

According to this, here, all of the first to fourth touch driving signals TDS1, TDS2, TDS3, and TDS4 applied to the first to fourth touch lines TL1, TL2, TL3, and TL4 may be orthogonal to one another.

Self-correlation for the first touch driving signal TDS1 applied to the first touch line TL1 can be represented as (−1×−1)+(1×1)+(−1×−1)+(1×1)+(−1×−1)+(1×1)=6, and thus, self capacitance touch sensing scheme may be applied.

Thus, using the orthogonality of touch driving signals TDS applied to adjacent touch lines TLs, it is possible accurately to discern touch locations taking account of self-capacitance touch sensing signals, and mutual capacitance touch sensing signals formed between the adjacent touch lines TLs.

Figure 4:
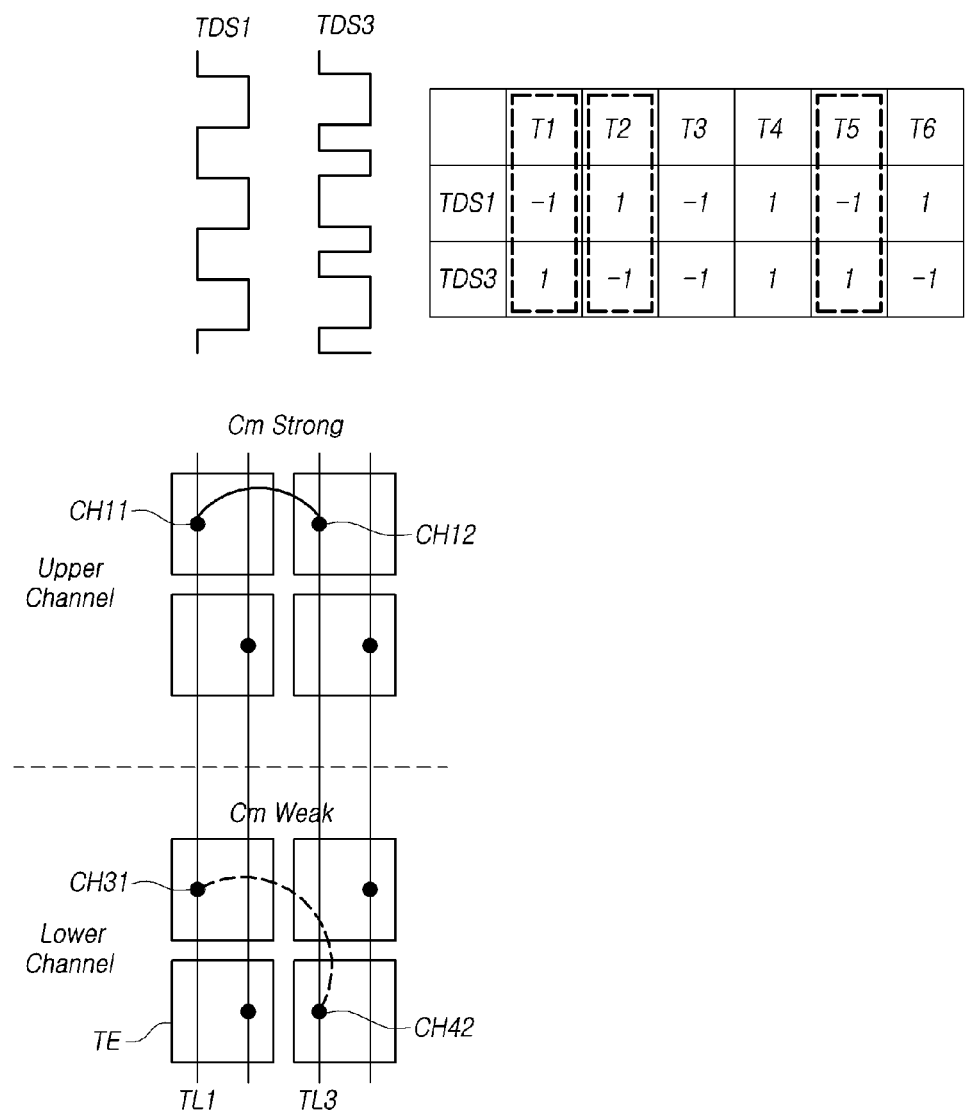
FIG. 4 illustrates a difference in capacitances caused when orthogonal touch driving signals are applied to one or more adjacent touch electrode(s) in the touch display device according to embodiments of the present disclosure.

FIG. 4 illustrates a difference in capacitances caused when orthogonal touch driving signals are applied to one or more adjacent touch electrode(s) in the touch display device according to embodiments of the present disclosure.

FIG. 4 illustrates that in the touch display device 100 according to embodiments of the present disclosure, orthogonal touch driving signals TDS are applied to adjacent touch electrodes TEs, in a situation where 2 touch lines TLs are disposed in each touch electrode TE, and 2×2 matrix of touch electrodes TEs are disposed in both an associated upper channel and an associated lower channel.

Here, contact holes CH disposed in touch electrodes TE of the upper channel may have a different arrangement from contact holes CH disposed in touch electrodes TE of the lower channel.

In a situation where a first touch line TL1 and a second touch line TL2 are arranged in touch electrodes in a first column, and a third touch line TL3 and a fourth touch line TL4 are arranged in touch electrodes in a second column, the first touch line TL1 and the third touch line TL3 may be touch lines TL located at adjacent respective touch electrodes TE.

In this situation, when touch driving signals TDS1 and TDS3 orthogonal to each other are applied to the first touch line TL1 and the third touch line TL3, mutual capacitance Cm can be formed between contact holes CH connected to the first touch line TL1 and the third touch line TL3 in a period (T1, T2, T5) in which the first touch driving signal TDS1 and the third touch driving signal TDS3 are in reverse relationship with each other (i.e. 1 and −1, or −1 and 1).

That is, in the upper channel, mutual capacitance Cm can be formed between a contact hole CH11 in a first row and the first column connected to the first touch line TL1 and a contact hole CH12 in the first row and the second column connected to the third touch line TL3, and in the lower channel, mutual capacitance Cm can be formed between a contact hole CH31 in a third row and the first column connected to the first touch line TL1 and a contact hole CH42 in a fourth row and the second column connected to the third touch line TL3.

However, a distance between the contact hole CH11 in the first row and the first column, and the contact hole CH12 in the first row and the second column, which are located in the upper channel, is closer than a distance between the contact hole CH31 in the third row and the first column, and the contact hole CH42 in the fourth row and the second column, which are located in the lower channel. Therefore, a touch sensing signal sensed in the upper channel is greater than a touch sensing signal sensed in the lower channel.

Thus, by differently disposing contact holes CH disposed in touch electrodes TE of the upper channel and contact holes CH disposed in touch electrodes TE of the lower channel, and applying touch driving signals orthogonal to each other to adjacent respective touch electrodes TE, an actual touch and a ghost touch can be distinguished by causing mutual capacitances Cm of touch sensing signals generated in the upper channel to have a different level from mutual capacitances Cm of touch sensing signals generated in the lower channel.

Figure 5:
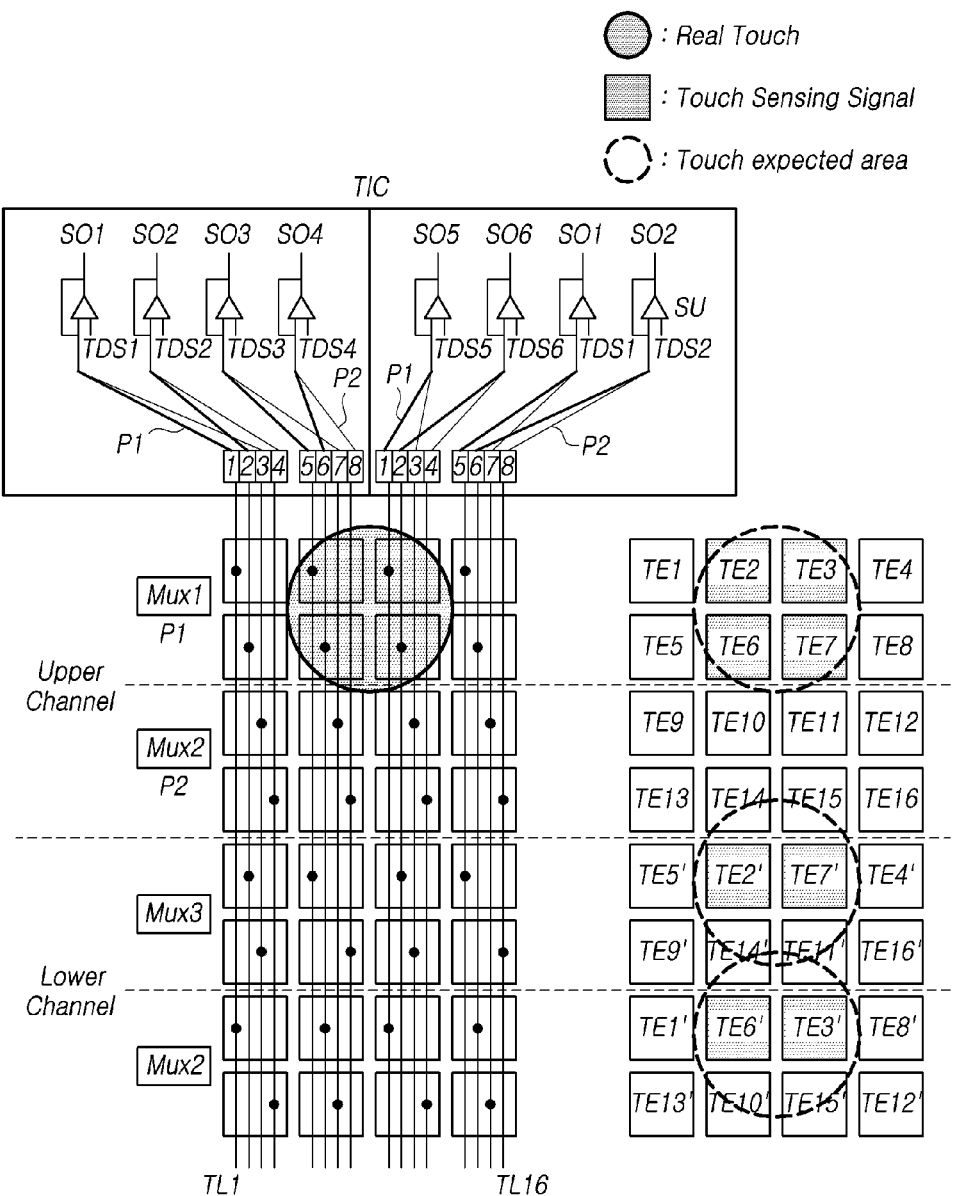
FIG. 5 is a diagram for illustrating a method of distinguishing between an actual touch and a ghost touch by applying touch driving signals orthogonal to one another to one or more adjacent touch electrode(s) in the touch display device according to embodiments of the present disclosure.

FIG. 5 is a diagram for illustrating a method of distinguishing between an actual touch and a ghost touch using touch driving signals orthogonal to one another to one or more adjacent touch electrode(s) in the touch display device according to embodiments of the present disclosure.

Referring to FIG. 5, in the display device 100 according to embodiments of the present disclosure, each of an upper channel and a lower channel may include 16 touch electrodes TEs disposed in 4×4 matrix, and thus, include 16 touch lines (TL1, . . . , TL16) connected to the respective 16 touch electrodes (TE1, . . . , TE16).

Here, when representing the 16 touch electrodes (TE1, . . . , TE16) arranged in the upper channel in the order of contact holes CH connected to the touch lines (TL1, . . . , TL16), contact holes CH for the 16 touch electrodes (TE1', . . . , TE16') disposed in the lower channel may be disposed differently from contact holes CH disposed in the upper channel. In this case, since the touch electrodes (TE1, . . . , TE16) of the upper channel and the touch electrodes (TE1', . . . , TE16') of the lower channel are connected to each other on a one-to-one basis, the touch electrodes (TE1', . . . , TE16') disposed in the lower channel are represented to correspond to the respective touch electrodes (TE1, . . . , TE16) of the upper channel.

In addition, by forming one driving line by connecting one multiplexer Mux per two rows of touch electrodes TEs to each of the upper channel and the lower channel, two rows of touch electrodes TEs can be driven by one multiplexer Mux.

At this time, since each of two multiplexers Mux1 and Mux2 disposed in the upper channel can provide a driving signal at a different time from each other, respective touch driving signals independent of each other are applied to touch electrodes TEs in first and second rows driven by the first multiplexer Mux1 and touch electrodes TEs in third and fourth rows driven by the second multiplexer Mux2, and then, touch sensing can be performed based on the applied touch driving signals.

That is, since the first touch electrode TE1 disposed in the first row and a fifth touch electrode TE5 disposed in the second row are disposed to be adjacent to each other in the upper channel, and touch sensing for the first touch line TL1 and the second touch line TL2 connected to them are simultaneously performed by the first multiplexer Mux1, it is desirable that touch driving signals TDS1 and TDS5 applied to the first touch line TL1 and the second touch line TL2 may be signals orthogonal to each other.

Since touch sensing for a ninth touch electrode TE9 disposed in the third row and a thirteen touch electrode TE13 disposed in the fourth row is performed by the second multiplexer Mux2, and the ninth touch electrode TE9 and the thirteenth touch electrode TE13 are driven independent of the first touch electrode TE1 and the fifth touch electrode TE5 for which touch sensing is performed by the first multiplexer Mux1, a touch driving signal TDS identical to a touch driving signal TDS1 applied to the first touch line TL1 may be applied to the third touch line TL3 connected to the ninth touch electrode TE9, or a touch driving signal TDS identical to a touch driving signal TDS5 applied to the second touch line TL2 may be applied to a fourth touch line TL4 connected to the thirteenth touch electrode TE13.

Accordingly, a touch circuit TIC may be configured to perform touch sensing operations by applying an identical touch driving signal TDS to the first touch line TL1 and the third touch line TL3 independent of each other and by connecting the first touch line TL1 and the third touch line TL3 to one sensing unit SU. Here, a touch circuit TIC may have a structure in which an identical touch driving signal TDS is applied to touch lines TL being independently disposed, and touch sensing signals TSS provided through two adjacent touch lines TL are received through one sensing unit SU.

Accordingly, in the case of distinguishing between areas to which scan signals are applied using a plurality of multiplexers Muxs, touch sensing can be performed using the number of sensing units SUs that is smaller than the number of the touch electrodes TEs.

Further, in the touch display device 100 according to embodiments of the present disclosure, since touch driving signals TDS orthogonal to each other are applied to adjacent touch electrodes TEs, orthogonal touch driving signals TDS may be applied to adjacent respective touch electrodes TEs with respect to any touch electrode TE.

Accordingly, in the touch display device 100 according to embodiments of the present disclosure, by applying six touch driving signals TDS orthogonal to one another to two touch lines TLs connected to any touch electrode TE to be detected and two touch lines TLs connected to respective touch electrodes TEs located on left and right sides of each of the two touch lines TL, an actual touch can be distinguished from a ghost touch (see FIG. 6).

Here, the six orthogonal touch driving signals (TDS1, ..., TDS6) may be determined based on touch electrodes (TE1, ..., TE8) to which scan signals are applied through the first multiplexer Mux1, and from the left, the six orthogonal touch driving signals (TDS1, TDS2, TDS3, TDS4, TDS5, TDS6) applied in sequence to the first touch electrode TE1 and the fifth touch electrode TE5, the second touch electrode TE2 and the sixth touch electrode TE6, and the third touch electrode TE3 and the seventh touch electrode TE7 may have orthogonal relationships.

Thus, when touch driving signals TDS orthogonal to each other are applied to touch electrodes TEs, the associated sensing unit SU may receive six touch sensing signals (TSS1, ..., TSS6) including mutual capacitance Cm formed between touch electrodes TEs.

In this case, since contact holes CHs disposed in the upper channel and the lower channel are differently disposed, touch sensing signals (TSS1, ..., TSS6) received from the sensing unit SU may have different values of mutual capacitance Cm depending on a distance between the contact holes CHs. That is, since a touch sensing signal TSS received from any sensing unit SU are associated with six orthogonal touch driving signals, the touch sensing signal TSS can be represented as TSS=a*TDS1+b*TDS2+c*TDS3+d*TDS4+e*TDS5+f*TDS6. Here, a, b, c, d, e and f are constants according to distances between contact holes CHs.

Here, it is assumed that an actual touch is performed on the second touch electrode TE2, the third touch electrode TE3, the sixth touch electrode TE6, and the seventh touch electrode TE7 in the upper channel.

When the actual touch is performed on the second touch electrode TE2, the third touch electrode TE3, the sixth touch electrode TE6, and the seventh touch electrode TE7 in the upper channel, mutual capacitance Cm can be formed between one or more of adjacent touch electrodes TE in the second touch electrode TE2, the third touch electrode TE3, the sixth touch electrode TE6, and the seventh touch electrode TE7. Thus, touch sensing signals TSS can be provided to the sensing unit SU through touch lines TLs connected to the corresponding touch electrodes (TE2, TE3, TE6, TE7).

At this time, touch sensing signals TSS may be generated by mutual capacitance Cm formed between associated adjacent touch electrodes TE in even a second touch electrode TE2', a third touch electrode TE3', a sixth touch electrode TE6' and a seventh touch electrode TE7' in the lower channel, which are connected to the respective touch electrodes in the upper channel, as well as the second touch electrode TE2, the third touch electrode TE3, the sixth touch electrode TE6 and the seventh touch electrode TE7 in the upper channel.

In this case, since the touch electrodes TEs disposed in the upper channel and the touch electrodes TEs disposed in the lower channel are differently disposed, areas in which touch sensing signals TSS are generated in the upper channel may be different from areas in which touch sensing signals TSS are generated in the lower channel.

At this time, the sensing unit SU can generate sensing output signals (SO1, ..., SO6) by comparing touch sensing signals TSS and touch driving signals TDS including mutual capacitance Cm and self-capacitance Cs formed through touch electrodes TEs by a touch of a finger or a stylus.

That is, using touch driving signals TDS orthogonal to each other, the touch circuit TIC can determine whether an area in which an actual touch has been performed is an area in which a touch sensing signal TSS has been generated in the upper channel or an area in which a touch sensing signal TSS has been generated in the lower channel.

For example, a method is discussed of distinguishing an actual touch from a ghost touch based on a touch sensing signal TSS sensed from the sixth touch electrode TE6 of the upper channel.

Figure 7:
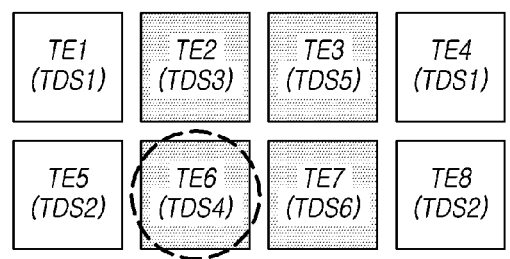
FIG. 7 illustrates a relationship between touch driving signals and touch electrodes from which touch sensing signals are generated in an upper channel and a lower channel when a touch is performed as illustrated in FIG. 5.
Figure 7:
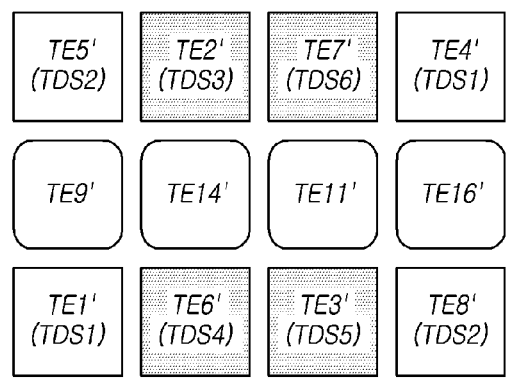

FIG. 7 illustrates a relationship between touch driving signals and touch electrodes from which touch sensing signals are generated in an upper channel and a lower channel when a touch is performed as illustrated in FIG. 5.

Referring to FIG. 7, a touch sensing signal TSS detected through the sixth touch electrode TE6 of the upper channel may be represented as TSS=a*TDS1+b*TDS2+c*TDS3+d*TDS4+e*TDS5+f*TDS6, as described above.

First, in the upper channel, due to a first touch driving signal TDS1, mutual capacitance Cm through the sixth touch electrode TE6 may be affected by a distance from a first touch electrode TE1 to which the first touch driving signal TDS1 is applied. Since the first touch electrode TE1 is diagonally facing the sixth touch electrode TE6, an effect of corresponding mutual capacitance Cm may be small. Meanwhile, since a touch has not been performed on the first touch electrode TE1, self-capacitance Cs may not be formed.

Further, mutual capacitance Cm affecting the sixth touch electrode TE6 due to a second touch driving signal TDS2 is affected by a distance from a fifth touch electrode TE5 to which the second touch driving signal TDS2 is applied, and since the fifth touch electrode TE5 is located to be adjacent to the sixth touch electrode TE6, an effect of corresponding mutual capacitance Cm may be big. However, since a touch has not been performed on the fifth touch electrode TE51, self-capacitance Cs may not be formed.

Further, mutual capacitance Cm affecting the sixth touch electrode TE6 due to a third touch driving signal TDS3 is affected by a distance from the second touch electrode TE2 to which the third touch driving signal TDS3 is applied, and since the second touch electrode TE2 is located to be adjacent to the sixth touch electrode TE6, an effect of corresponding mutual capacitance Cm may be big. However, since a touch has been performed on the second touch electrode TE2, self-capacitance Cs may be formed.

Further, mutual capacitance Cm affecting the sixth touch electrode TE6 due to a fourth touch driving signal TDS4 is affected by a distance from a sixth touch electrode TE6 to which the fourth touch driving signal TDS4 is applied, and since the sixth touch electrode TE6 is the identical touch electrode TE6, self-capacitance Cs may be formed.

Further, mutual capacitance Cm affecting the sixth touch electrode TE6 due to a fifth touch driving signal TDS5 is affected by a distance from the third touch electrode TE3 to which the fifth touch driving signal TDS5 is applied. Here, since the third touch electrode TE3 is diagonally facing the sixth touch electrode TE6, an effect of corresponding mutual capacitances Cm may be small, and since a touch has been performed on the third touch electrode TE3, self-capacitance Cs may be formed.

Further, mutual capacitance Cm affecting the sixth touch electrode TE6 due to a sixth touch driving signal TDS6 is affected by a distance from the seventh touch electrode TE7 to which the sixth touch driving signal TDS6 is applied. Here, since the seventh touch electrode TE7 is located to be adjacent to the sixth touch electrode TE6, an effect of corresponding mutual capacitances Cm may be big, and since a touch has been performed on the seventh touch electrode TE7, self-capacitance Cs may be formed.

In the lower channel, in a relationship with a sixth touch electrode TE6', since it is adjacent to a first touch electrode TE1' to which the first touch driving signal TDS1 is applied, an effect of corresponding mutual capacitance Cm may be big, but since a touch has not been performed, self-capacitance Cs may not be formed.

Further, in the relationship with the sixth touch electrode TE6', since a fifth touch electrode TE5' to which the second touch driving signal TDS2 is applied is located in a remote distance from the sixth touch electrode TE6', an effect of corresponding mutual capacitance Cm may be small, and since a touch has not been performed, self-capacitance Cs may not be formed.

Further, in the relationship with the sixth touch electrode TE6', since a second touch electrode TE2' to which the third touch driving signal TDS3 is applied is located in a remote distance from the sixth touch electrode TE6', an effect of corresponding mutual capacitance Cm may be small, and since a touch has not been performed, self-capacitance Cs may not be formed.

Further, in the relationship with the sixth touch electrode TE6', although a touch is not performed on a sixth touch electrode TE6' to which the fourth touch driving signal TDS4 is applied, since it is located in the identical location, self-capacitance Cs may be formed.

Further, in the relationship with the sixth touch electrode TE6', since a third touch electrode TE3' to which the fifth touch driving signal TDS5 is applied is located to be adjacent to the sixth touch electrode TE6', an effect of corresponding mutual capacitance Cm may be big, and since a touch has not been performed, self capacitance Cs may not be formed.

Further, in the relationship with the sixth touch electrode TE6', since a seventh touch electrode TE7' to which the sixth touch driving signal TDS6 is applied is located in a remote distance from the sixth touch electrode TE6', an effect of corresponding mutual capacitance Cm may be small, and since a touch has not been performed, self-capacitance Cs may not be formed.

That is, with reference to the sixth touch electrode TE6, a coefficient a representing a touch sensing signal TSS represents an effect of mutual capacitance Cm formed between the first touch electrode TE1 to which the first touch driving signal TDS1 is applied and the sixth touch electrode TE6, and a coefficient b represents an effect of mutual capacitance Cm formed between the fifth touch electrode TE5 to which the second touch driving signal TDS2 is applied and the sixth touch electrode TE6. Further, a coefficient c represents an effect of mutual capacitance Cm formed between the second touch electrode TE2 to which the third touch driving signal TDS3 is applied and the sixth touch electrode TE6, and a coefficient d represents an effect of mutual capacitance Cm formed between the sixth touch electrode TE6 to which the fourth touch driving signal TDS4 is applied and the sixth touch electrode TE6. Further, a coefficient e represents an effect of mutual capacitance Cm formed between the third touch electrode TE3 to which the fifth touch driving signal TDS5 is applied and the sixth touch electrode TE6, and a coefficient f represents an effect of mutual capacitance Cm formed between the seventh touch electrode TE7 to which the sixth touch driving signal TDS6 is applied and the sixth touch electrode TE6.

Accordingly, when coefficients a to f for determining values of touch sensing signals TSS are determined, it is possible to recognize an effect of mutual capacitance Cm formed between a specific touch electrode TE and an adjacent touch electrode TE.

Figure 8A:
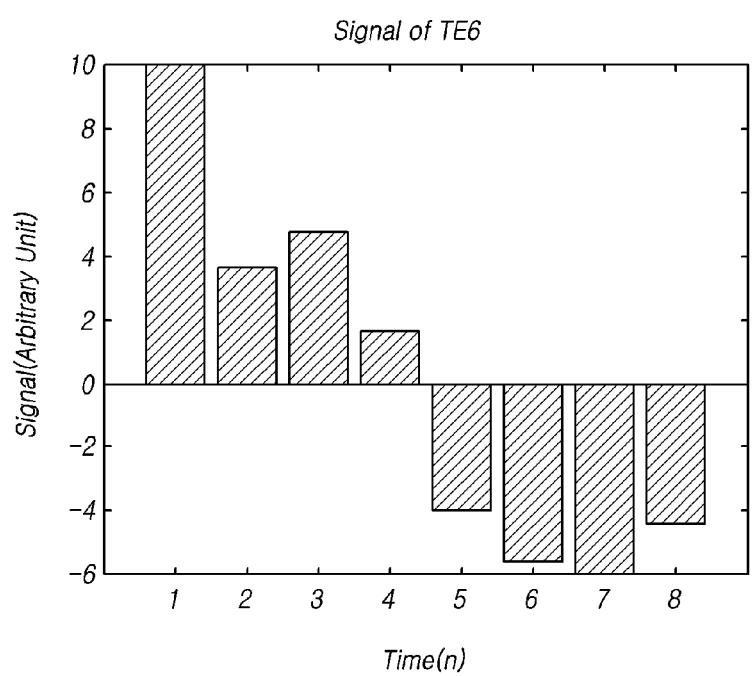
FIGS. 8A to 8C are charts for illustrating calculation of self-capacitances from touch sensing signals and mutual capacitances with one or more adjacent touch electrode(s), in the case of FIG. 7 according to embodiments of the present disclosure.
Figure 8B:
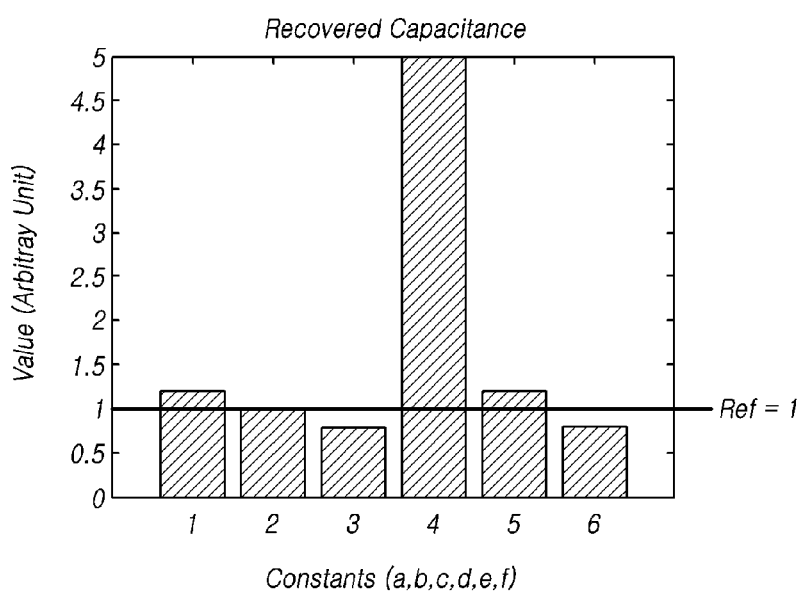
Figure 8C:
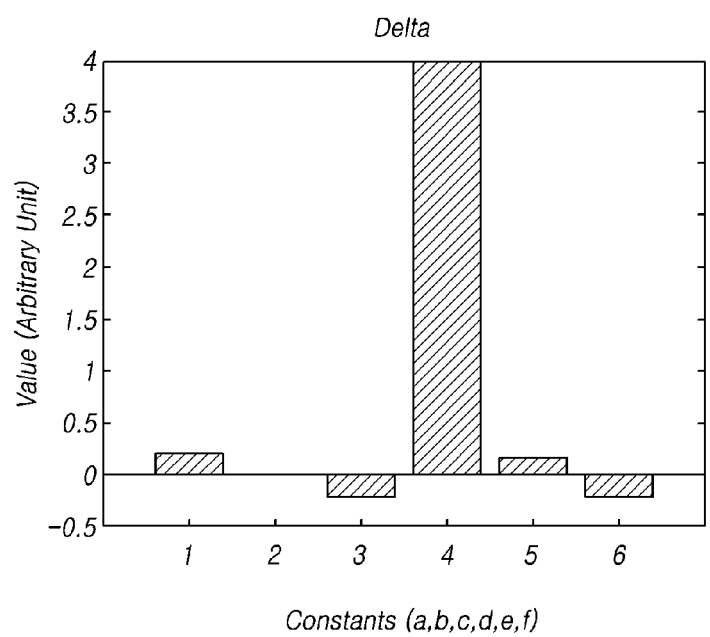

FIGS. 8A to 8C are charts for illustrating calculation of self-capacitances from touch sensing signals and mutual capacitances between the sixth touch electrode TE6 and adjacent touch electrodes, in the case of FIG. 7 according to embodiments of the present disclosure.

Here, FIG. 8A illustrates touch sensing signals TSS derived through the sixth touch electrode TE6 of the upper channel. FIG. 8B illustrates results obtained by restoring touch sensing signals TSS derived in FIG. 8A for six touch driving signals (TDS1, . . . , TDS6) orthogonal to one another and calculating the coefficients (a, b, c, d, e, f) corresponding to each touch driving signal (TDS1, . . . , TDS6).

Here, when subtracting a reference value (Ref=1) by self-capacitance Cs, coefficients (a, b, c, d, e, and as shown in FIG. 8C can be obtained.

FIG. 9 illustrates an effect of capacitance formed between the sixth touch electrode TE6 and adjacent touch electrodes using the coefficients (a to f) determined from a value of a touch sensing signal TSS of the sixth touch electrode TE6, in the case of FIG. 7 according to embodiments of the present disclosure.

Referring to FIG. 9, for an effect of capacitances between a touch electrode (here, the sixth touch electrode) to be detected from FIG. 8C and one or more adjacent touch electrode TE, the presence or absence of a touch and touch relevance on the sixth touch electrode TE6 and one or more adjacent touch electrode TE may be recognized as in FIG. 9 using coefficients (a to f) representing touch sensing signals TSS.

That is, when a value of a touch sensing signal TSS from the sixth touch electrode TE6 to be detected in the upper channel is calculated as coefficients (a to f) represented in the drawing with respect to first to sixth touch driving signals (TDS1 to TDS6), it is possible to recognize an effect of capacitances between the sixth touch electrode TE6 to be detected and adjacent touch electrodes TE from coefficients (a to f) of determining the value of the touch sensing signal TSS.

Here, an effect between touch electrodes TE is represented by the presence or absence of a touch (N: No-touch, T: Touch) determined based on self-capacitance Cs, and mutual capacitance relevance (S: Low, B: High) determined based on mutual capacitance Cm.

For example, in the upper channel, since an actual touch has not been performed on a first touch electrode TE1 to which the first touch driving signal TDS1 is applied, and thus, self-capacitance Cs in the first touch electrode TE1 may not be formed, the presence or absence of a touch through self-capacitances Cs is determined as No-touch N, and since a distance from the sixth touch electrode TE6 is large, an effect of mutual capacitance Cm is determined as Low S.

Further, since an actual touch has not been performed on a fifth touch electrode TE5 to which the second touch driving signal TDS2 is applied, and thus, self-capacitances Cs in the fifth touch electrode TE5 may not be formed, the presence or absence of a touch through self-capacitance Cs is determined as No-touch N, and since a distance from the sixth touch electrode TE6 is small, an effect of mutual capacitance Cm is determined as High B.

Further, since an actual touch has been performed on a second touch electrode TE2 to which the third touch driving signal TDS3 is applied, self-capacitance Cs in the second touch electrode TE2 may be formed. Due to this, the presence or absence of a touch through self-capacitance Cs is determined as Touch T, and since a distance from the sixth touch electrode TE6 is small, an effect of mutual capacitance Cm is determined as High B.

Meanwhile, since an actual touch has been performed on the sixth touch electrode TE6 to which a fourth touch driving signal TDS4 is applied, the presence or absence of a touch through self-capacitance Cs is determined as Touch T, and since the corresponding touch is a touch for itself, it can be determined as the same touch Self.

Through this method, it is possible to determine the presence or absence of a touch and touch relevance for the sixth touch electrode TE6 and adjacent touch electrodes TEs.

Meanwhile, in the lower channel, since an actual touch has not been performed, the presence or absence of a touch by self-capacitance Cs is determined as No-touch N, and therefore, only an effect of mutual capacitance Cm according to a distance from the sixth touch electrode TE6 may be determined.

That is, in touch electrodes TEs of the lower channel, since self-capacitance Cs for itself are not formed, an effect of corresponding mutual capacitance Cm based on the sixth touch electrode TE6' may be present, but may be determined as a ghost touch.

At this time, an effect of capacitances between the sixth touch electrode TE6' and adjacent touch electrodes TEs may be determined as a reference value for determining the presence or absence of a touch by self-capacitance Cs and a reference value for determining an effect of mutual capacitance Cm, for coefficients (a to f) representing touch sensing signals TSS.

For example, a value of 2 or more may be determined as a reference for the presence or absence of a touch by self-capacitance Cs, and a value of −0.1 or less may be determined as a reference for an effect of mutual capacitance Cm.

When these reference values are applied to FIG. 8C, c, d, and f among the coefficients of the touch sensing signal TSS may be selected. Accordingly, with respect to the coefficients of c, d, and f, in relationships with the sixth touch electrode TE6, it can be determined that an actual touch has been performed in the second touch electrode TE2 represented by the coefficient c, the sixth touch electrode TE6 represented by the coefficient d, and the seventh touch electrode TE7 represented by the coefficient f.

Accordingly, when the presence or absence of a touch is determined using self-capacitance Cs and touch relevance with one or more adjacent touch electrode TE is determined using mutual capacitance Cm, it can be determined that an actual touch has been performed on a touch electrode TE corresponding to a case where a touch is present and touch relevance is high.

Figure 10:
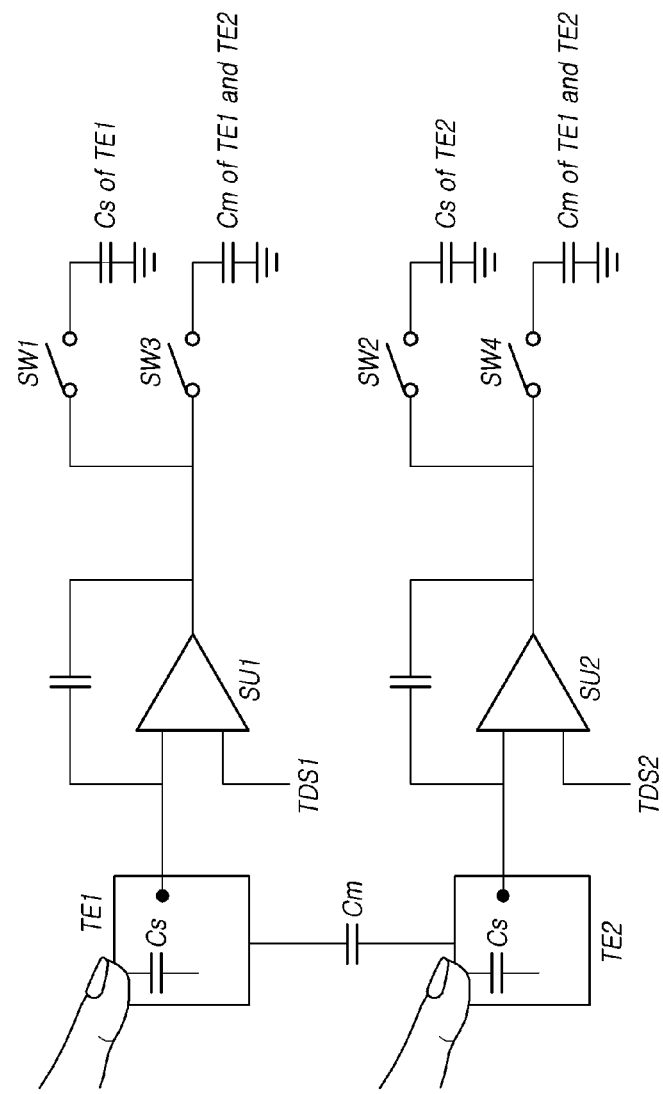
FIG. 10 illustrates a method of determining the presence or absence of a touch by self capacitances through any touch electrode and an effect caused by mutual capacitances with one or more other touch electrode(s) in the touch display device according to another embodiment of the present disclosure.

FIG. 10 illustrates a method of determining the presence or absence of a touch by self-capacitance through any touch electrode and an effect caused by mutual capacitance with one or more other touch electrode in the touch display device according to another embodiment of the present disclosure.

Referring to FIG. 10, a first sensing unit SU1 is connected to a first touch electrode TE1, and based on this connection, self-capacitance Cs and mutual capacitance Cm may be detected with reference to a first touch driving signal TDS1. Further, a second sensing unit SU2 us connected to a second touch electrode TE2, and based on this connection, self-capacitance Cs and mutual capacitance Cm may be detected with reference to a second touch driving signal TDS2.

When the first touch electrode TE1 and the second touch electrode TE2 are adjacent to each other, the first touch driving signal TDS1 and the second touch driving signal TDS2 may be orthogonal to each other.

At this time, when a first switch SW1 connected to an output terminal of the first sensing unit SU1 is turned on according to an operation time of the first touch driving signal TDS1, self-capacitance Cs of the first touch electrode TE1 may be output, and when a second switch SW2 connected to an output terminal of the second sensing unit SU2 is turned on according to an operation time of the second touch driving signal TDS2, self-capacitance Cs of the second touch electrode TE2 may be output.

When a third switch SW3 connected to the output terminal of the first sensing unit SU1 is turned on according to an operation time of the second touch driving signal TDS2, the first sensing unit SU1 may output mutual capacitance Cm between the first touch electrode TE1 and the second touch electrode TE2.

Likewise, when a fourth switch SW4 connected to the output terminal of the second sensing unit SU2 is turned on according to an operation time of the first touch driving signal TDS1, the second sensing unit SU2 may output mutual capacitance Cm between the first touch electrode TE1 and the second touch electrode TE2.

Thus, by controlling a switch connected to an output terminal of each sensing unit SU according to time of touch driving signals TDS orthogonal to one another, self-capacitance Cs through each touch electrode TE and mutual capacitance Cm with other touch electrodes TE may be detected and according to the detected capacitances, coefficients of a touch sensing signal TSS may be determined.

Thus, by deriving self-capacitance Cs and the mutual capacitance Cm from the touch sensing signal TSS, operations for distinguishing between an actual touch and a ghost touch may be performed by a touch controller TCR in a corresponding touch circuit TIC.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A touch display device comprising:
   a display panel including a plurality of touch electrodes disposed in a matrix pattern in a first channel area and a second channel area adjacent to the first channel area, and a plurality of touch lines; and
   a touch circuit supplying touch driving signals orthogonal to one another to adjacent touch electrodes through at least one of the plurality of touch lines,
   wherein the plurality of touch electrodes include a first touch electrode, a second touch electrode, a third touch electrode, and a fourth touch electrode sequentially disposed in one column, the first touch electrode and the second touch electrode disposed adjacent to each other in the first channel area, and the third touch electrode and the fourth touch electrode disposed adjacent to each other in the second channel area,
   wherein a first touch line of the plurality of touch lines connects between the first touch electrode and the fourth touch electrode via a first contact hole formed in the first touch electrode and a fourth contact hole formed in the fourth touch electrode, and the first touch line overlaps the first touch electrode, the second touch electrode, the third touch electrode, and the fourth touch electrode, wherein a second touch line of the plurality of touch lines connects between the second touch electrode and the third touch electrode via a second contact hole formed in the second touch electrode and a third contact hole formed in the third touch electrode, and the second touch line overlaps the first touch electrode, the second touch electrode, the third touch electrode, and the fourth touch electrode, and
   wherein a minimum distance between the first contact hole and the fourth contact hole is longer than a minimum distance between the second contact hole and the third contact hole.

2. The touch display device according to claim 1, wherein the first touch electrode and the fourth touch electrode connected with the first touch line are disposed in a n-th row of the first channel area and in a q-th row of the second channel area, respectively, where the n and the q are natural numbers of 1 or more, and wherein the second touch electrode and the third touch electrode connected with the second touch line, which are not connected to the first touch line, are in another row other than the n-th row of the first channel area and in another row other than the q-th row of the second channel area, respectively.

3. The touch display device according to claim 1, wherein the plurality of touch electrodes is sequentially disposed along a first direction in the first channel area or the second channel area, and wherein the plurality of touch electrodes is connected to the plurality of touch lines through one or more contact holes.

4. The touch display device according to claim 1, wherein the first channel area or the second channel area includes a plurality of multiplexers applying independent scan signals.

5. The touch display device according to claim 1, wherein the touch driving signals orthogonal to one another are applied to adjacent touch electrodes in a direction intersecting the at least one of the plurality of touch lines.

6. The touch display device according to claim 1, wherein the touch circuit includes a touch controller distinguishing between an actual touch and a ghost touch by deriving self-capacitance and mutual capacitance from touch sensing signals transferred from the touch electrodes.

7. The touch display device according to claim 6, wherein the touch controller determines a presence of a touch using the self-capacitance and determines touch relevance with adjacent touch electrodes using the mutual capacitance.

8. The touch display device according to claim 7, wherein the touch controller determines that an actual touch has been performed on a touch electrode for which the touch is present and touch relevance is high.

9. The touch display device according to claim 6, wherein the touch circuit comprising:
   a sensing unit receiving the touch sensing signals transferred from the touch electrodes as a first input signal, and receiving the touch driving signals applied to the touch electrodes as a second input signal; and a switch for deriving the self-capacitance and the mutual capacitance according to the touch driving signals.

10. The touch display device according to claim 1, wherein the first contact hole and the second contact hole in the first channel area and the third contact hole and the fourth contact hole in the second channel area are symmetrical to each other.

11. A method of driving a touch display device including a display panel comprising a plurality of first touch electrodes disposed in a first channel area, a plurality of second touch electrodes disposed in a second channel area, and a plurality of touch lines, at least one of which is connected to at least one of the plurality of first touch electrodes and at least one of the plurality of second touch electrodes through a plurality of contact holes, the method comprising:
supplying touch driving signals orthogonal to one another to adjacent touch electrodes through at least one of the plurality of touch lines;
deriving self-capacitance and mutual capacitance from touch sensing signals transferred from the touch electrodes; and
distinguishing between an actual touch and a ghost touch using the self-capacitance and the mutual capacitance.

12. The method according to claim 11, wherein the plurality of touch lines includes a first touch line and a second touch line,
wherein the first touch line is connected to one of touch electrodes disposed in a n-th row of the first channel area and one of touch electrodes disposed in a p-th row of the second channel area, where the n and the p are natural numbers of 1 or more, and
wherein the second touch line is connected to another one of the touch electrodes, which is not connected to the first touch line, disposed in the n-th row of the first channel area and one of touch electrodes disposed in another row other than the p-th row of the second channel area.

13. The method according to claim 11, wherein the plurality of touch electrodes is sequentially disposed along a first direction in the first channel area or the second channel area, and wherein the plurality of touch electrodes is connected to the plurality of touch lines through one or more contact holes.

14. The method according to claim 11, wherein the first channel area or the second channel area includes a plurality of multiplexers applying independent scan signals.

15. The method according to claim 11, wherein the touch driving signals orthogonal to one another are applied to adjacent touch electrodes in a direction intersecting the at least one of the plurality of touch lines.

16. The method according to claim 11, wherein the distinguishing between the actual touch and the ghost touch comprising:
determining a presence of a touch using the self-capacitance; and
determining touch relevance with adjacent touch electrodes using the mutual capacitance.

17. The method according to claim 16, wherein when the touch is present and the touch relevance is high, it is determined that an actual touch has been performed on a corresponding touch electrode.

* * * * *